United States Patent
Liang et al.

(10) Patent No.: US 11,489,664 B2
(45) Date of Patent: Nov. 1, 2022

(54) CONTRIBUTION INCENTIVE-BASED BLOCKCHAIN COLLABORATION METHOD AND SYSTEM

(71) Applicant: Renmin University of China, Beijing (CN)

(72) Inventors: Xun Liang, Beijing (CN); Kongbo Li, Beijing (CN); Yang Xue, Beijing (CN)

(73) Assignee: Renmin University of China, Beijing (CN)

( * ) Notice: Subject to any disclaimer, the term of this patent is extended or adjusted under 35 U.S.C. 154(b) by 213 days.

(21) Appl. No.: 16/855,894

(22) Filed: Apr. 22, 2020

(65) Prior Publication Data
US 2021/0083849 A1 Mar. 18, 2021

(30) Foreign Application Priority Data

Sep. 17, 2019 (CN) .......................... 201910874266.1

(51) Int. Cl.
*H04L 29/06* (2006.01)
*H04L 9/06* (2006.01)
*H04L 9/00* (2022.01)

(52) U.S. Cl.
CPC .............. *H04L 9/0637* (2013.01); *H04L 9/50* (2022.05)

(58) Field of Classification Search
CPC . H04L 63/102; H04L 9/3228; H04L 63/0838; H04L 63/0876; H04L 63/107; H04L 2209/38; H04L 2463/082; H04L 63/0407; H04L 9/3239
See application file for complete search history.

(56) References Cited

U.S. PATENT DOCUMENTS

| | | | | |
|---|---|---|---|---|
| 10,621,164 B1* | 4/2020 | Kain | ....................... | G16H 10/60 |
| 11,188,977 B2* | 11/2021 | Youb | .................... | G06F 16/1805 |
| 2016/0189082 A1* | 6/2016 | Garrish | .................. | G06Q 30/01 |
| | | | | 705/7.39 |
| 2018/0316716 A1* | 11/2018 | Kozloski | ............. | H04L 63/1441 |

(Continued)

*Primary Examiner* — Mahfuzur Rahman
(74) *Attorney, Agent, or Firm* — Baker Hostetler LLP

(57) ABSTRACT

The invention relates to a contribution incentive-based blockchain collaboration method and system, which is characterized in, comprising: 1) applying from an ordinary node to a qualification assessment node for registered qualification; 2) dividing a task into a number of subject tasks and creating corresponding subject task ledgers respectively, and creating a number of sub-tasks corresponding to the subject task in each of the subject task ledgers; 3) applying from the ordinary node to the qualification assessment node for receiving the sub-tasks; 4) by the qualification assessment node, auditing all sub-tasks which are applied for reception by the ordinary node; 5) submitting completed sub-tasks from the ordinary node to a task quality audit node; 6) by the task quality audit node, calculating contribution incentives and qualification credits for the sub-tasks completed by the ordinary node; 7) by the task quality audit node, traversing through each subject task ledger respectively, for finding out a block with the highest content quality evaluation score for each completed sub-task, and giving reward to the ordinary node corresponding to the block. The invention can be widely used in the technical field of blockchain.

9 Claims, 1 Drawing Sheet

(56) References Cited

U.S. PATENT DOCUMENTS

| | | | |
|---|---|---|---|
| 2020/0117690 A1* | 4/2020 | Tran | G06F 16/90332 |
| 2020/0167512 A1* | 5/2020 | Chitra | G06Q 30/0185 |
| 2020/0394708 A1* | 12/2020 | Celia | G06Q 40/025 |
| 2021/0174972 A1* | 6/2021 | Pavlatos | G16H 70/00 |
| 2021/0272132 A1* | 9/2021 | Yang | H04L 9/50 |
| 2021/0342836 A1* | 11/2021 | Celia | G06Q 50/01 |
| 2022/0116736 A1* | 4/2022 | Williams | A61B 5/4845 |

\* cited by examiner

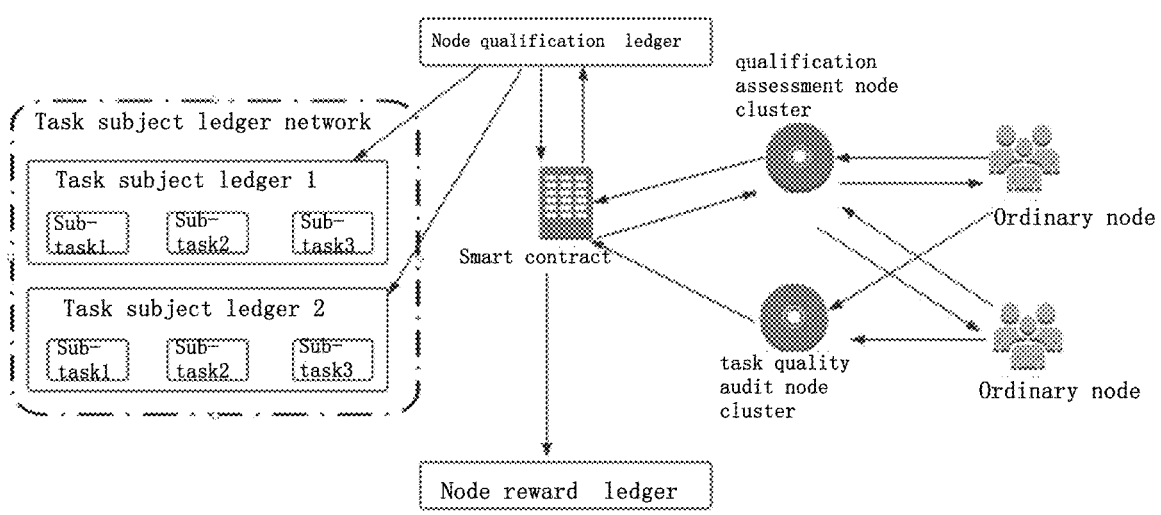

CONTRIBUTION INCENTIVE-BASED BLOCKCHAIN COLLABORATION METHOD AND SYSTEM

CROSS-REFERENCE TO RELATED APPLICATIONS

This application claims priority to China Patent Application No. CN 2019108742661 filed Sep. 17, 2019, the entire contents of which are incorporated by reference herein.

TECHNICAL FIELD

The present invention relates to a blockchain collaboration system, in particular to a contribution incentive-based blockchain collaboration method and system, which belongs to the technical field of blockchain.

BACKGROUND

Blockchain, which is also called distributed ledger, is an Internet database, having characteristic of decentralization, openness and transparency, any node able to participate in database records, and data tamper resistance, wherein the characteristic of openness, transparency, data traceability, and data tamper resistance provide a reliable physical foundation for a new generation of collaboration systems. Various nodes in the blockchain network trusts and connects with each other through network consensus. Ever since the original bitcoin, consensus incentives have always been the core of regulating the operational efficiency of the entire blockchain network.

The fundamental system of any distributed collaboration system should be incentives before constraints. By establishing a reasonable and efficient incentive system, the entire system is stimulated to actively develop, and then its health is maintained through constraints. Incentive is the essence of the blockchain. Through consensus incentives, many nodes are stimulated to participate in the creation of new blocks and jointly maintain the extension and survival of the chain. At this stage, many large-scale and high-complexity tasks are implemented through crowdsourcing mode after the task is decomposed. Crowdsourcing mode is an organization mode that outsources traditional centralized centralization task processing method to the general public through decomposing tasks by distributed collaboration system. In this process, the distributed collaboration systems encourage contributors to participate by paying task reward to contributors. However, the task crowdsourcing mode has the following disadvantages: 1) the participants are not fixed and the number is constantly changing; 2) the tasks to be decomposed are usually complex and cannot be processed by the computer.

SUMMARY

In view of the above problems, an object of the present invention is to provide a contribution incentive-based blockchain collaboration method and system that can handle large-scale and high-complexity tasks.

In order to achieve the above object, the present invention adopts the following technical solution: a contribution incentive-based blockchain collaboration method, which is characterized in, comprising: 1) applying from an ordinary node to a qualification assessment node for registered qualification, wherein the qualification assessment node gives an initial qualification credit to the ordinary node; 2) dividing a task into a number of subject tasks and creating corresponding subject task ledgers respectively, and creating a number of sub-tasks corresponding to the subject task in each of the subject task ledgers; 3) applying from the ordinary node to the qualification assessment node for receiving the sub-tasks; 4) by the qualification assessment node, auditing all sub-tasks which are applied for reception by the ordinary node according to the qualification credit, contribution incentive and reward of the ordinary node; 5) by the ordinary node, executing the sub-tasks that have passed audit, submitting the completed sub-tasks to the task quality audit node, and recording the completed sub-tasks in the form of blocks in the corresponding subject task ledger, wherein each block includes content quality evaluation scores of the sub-tasks completed by the ordinary node; 6) by the task quality audit node, calculating the contribution incentives and qualification credits for the sub-tasks completed by the ordinary node, and updating the contribution incentives and qualification credits of the ordinary node; 7) at the end of a life cycle of each subject task ledger, by the task quality audit node, traversing through each subject task ledger respectively, for finding out the block with the highest content quality evaluation score for each completed sub-task, and giving reward to the ordinary node corresponding to the block to update the reward of the ordinary node, and then completing the blockchain collaboration.

Further, before applying from the ordinary node to the qualification assessment node for registered qualification, it is required to establish a cluster of nodes of the blockchain and to divide the nodes in manner of roles, wherein the cluster of nodes includes the ordinary node, the qualification assessment node, and the task quality audit node.

Further, the specific process of step 1) is: 1.1) after the ordinary node joins a distributed collaboration system for the first time, applying to the qualification assessment node for registered qualification; 1.2) by the qualification assessment node, giving the initial qualification credit to the ordinary node through an audit rule of a smart contract; 1.3) by the qualification assessment node, recording the initial qualification credit of the ordinary node into a qualification credit ledger.

Further, the higher the qualification credit of the ordinary node in step 1.3), the more difficult sub-tasks can be received.

Further, the sub-tasks in step 2) include a specific content, a task difficulty coefficient, and an expected task performance period, an intended recipient and a task submission time of the sub-tasks.

Further, in step 3), one ordinary node can apply for receiving multiple sub-tasks at a time, and multiple ordinary nodes can apply for receiving the same sub-task.

Further, the audit process of step 4) is: 4.1) if the qualification credit of the ordinary node meets its preset qualification credit for applying for receiving the sub-task, the audit is passed and the sub-task is assigned to the ordinary node; 4.2) if the qualification credit of an ordinary node does not meet its preset qualification credit for applying for receiving the sub-task, the audit is not passed, and the ordinary node fails to apply to receive the sub-task.

Further, the specific process of step 6) is: 6.1) by the task quality audit node, calculating the contribution incentives for sub-tasks completed by the ordinary node through a smart contract, and writing the contribution incentives into a node reward ledger to update the contribution incentives of the ordinary node, wherein the contribution incentives of the sub-tasks are: wherein T is the contribution incentives of the sub-tasks, m is the number of received tasks, n is the number of completed tasks, xi is a completed task quality of the i-th task, pi is a task difficulty coefficient of the i-th task, yi is an expected task performance period of the i-th task, and zi is an actual task performance period of the i-th task; 6.2) by the task quality audit node, calculating the qualification credit of the ordinary node and writing the qualification credit into a qualification credit ledger to update the qualification credit of the ordinary node, wherein the qualification credit of the ordinary node is: wherein C is the qualification credit, Normalization is the normalization process; and k is a multiple of reward.

Further, the reward in step 7) is k times of the contribution incentive for completing the sub-task by the ordinary node corresponding to the block.

A contribution incentive-based blockchain collaboration system, which is characterized in, comprising: a registering qualification module to give an initial qualification credit to an ordinary node when the ordinary node applies to a qualification assessment node for registered qualification; a task dividing module to divide a task into a number of subject tasks, to respectively create corresponding subject task ledgers, and to create a number of sub-tasks corresponding to the subject task in each of the subject task ledgers; a task receiving module for the ordinary node applying to the qualification assessment node for receiving sub-tasks; a task audit module to audit all sub-tasks applied for reception by the ordinary node according to the qualification credit, contribution incentive and reward of the ordinary node; a data recording module to record the completed sub-tasks in the form of blocks in the corresponding subject task ledger, wherein each block includes content quality evaluation scores of the completed sub-tasks; a contribution incentive and qualification credit calculation module to calculate the contribution incentive and qualification credit for the sub-tasks completed by the ordinary node, and to update the contribution incentive and qualification credit of the ordinary node; a rewarding module for, at the end of a life cycle of each subject task ledger, the task quality audit node traversing through each subject task ledger respectively, finding out the block with the highest content quality evaluation score for each completed sub-task, and giving reward to the ordinary node corresponding to the block to update the reward of the ordinary node, and then completing the blockchain collaboration.

By adopting the above technical solutions, the present invention has the following advantages: 1. the present invention utilizes the advantages of consensus incentives of the blockchain and the nature of its distributed collaboration system, and uses the blockchain's Token as a reward for contribution; tokens are generated and consumed according to the status of the ordinary node receiving tasks and completing tasks, thereby stimulating the entire collaboration system for healthy development. 2. the present invention has universal applicability to many blockchain platforms; by rationally splitting the subject tasks and their sub-tasks, the complexity of the blockchain network and the difficulty for processing task can be flexibly controlled; data verification is achieved through smart contracts deployed on nodes; the dynamic replacement of validation rules is achieved; it can be widely used in the technical field of blockchain.

BRIEF DESCRIPTION OF THE DRAWINGS

FIG. 1 is a schematic diagram of executing task in the method of the present invention.

DETAILED DESCRIPTION

The present invention is described in detail below with reference to the drawings. It should be understood, however, that the drawings are provided only for a better understanding of the present invention and they should not be construed as limiting the present invention.

First, the nodes and blockchain ledgers are explained:

1) The nodes include the following:

1.1) an ordinary node, as the actual node for executing tasks, which is used to receive tasks, execute tasks, and submit tasks.

1.2) a qualification assessment node which is used to audit the qualification of the ordinary node that proposes to receive the tasks through the smart contract audit rules; if the audit is passed, the tasks are assigned, and if the audit is rejected, the tasks are refused to be assigned.

1.3) a task quality audit node which is used to determine the quality of tasks executed, completed and submitted by the ordinary node through the verification rules of smart contracts, and give the quality score.

2) The blockchain ledgers include the following:

2.1) a subject task ledger: after the task is decomposed, the subject task is taken as a unit; each subject task corresponds to a complete blockchain ledger, which is called subject task ledger; each block in the subject task ledger is a subject task, and is also a specific sub-task that need to be executed by the nodes, and all the block residents who operate on the sub-tasks in the current subject task ledger are recorded in the tail of the current subject task ledger in an additional form. Once the subject task ledger is created, there is a life cycle, which is subject to the deadline of the actual task.

2.2) a qualification credit ledger: when an ordinary node receives tasks, the qualification assessment node accesses the qualification credit ledger to obtain the qualification credit of the ordinary node. When the ordinary node completes tasks, the quality is determined by the task quality audit node, for continually updating to the latest node qualification of the ordinary node.

2.3) a node reward ledger: when an ordinary node completes a task and its quality is determined through a task quality audit node, its contribution token is calculated through a smart contract and written into the node reward ledger. All ordinary nodes can access the node reward ledger, obtain their final reward, and consume them.

3) The influencing factors of contribution incentives of the ordinary node include the number of received tasks m, the task difficulty coefficient p, the number of completed tasks n, the quality of completed tasks x, the expected task performance period y, and the actual task performance period z.

The total contribution incentive T for the node completing the task is:

Wherein xi is a completed task quality of the i-th task, pi is a task difficulty coefficient of the i-th task, yi is an expected task performance period of the i-th task, and zi is an actual task performance period of the i-th task.

The task difficulty coefficient p is determined according to the actual processed problem. After receiving the tasks, the ordinary node can submit all completed tasks at one time, or submit one task after completing the task. After each task submission, the task quality assessment node will score the quality of all submitted tasks, and finally calculate the total contribution incentive T of the tasks completed by the node at one time, and write it into the node reward ledger. The task quality assessment node also determines the qualification credit of the ordinary node according to n/m, and the qualification credit C is:

Wherein Normalization is the normalization process; k is the multiple of reward.

The higher the historical completion rate of tasks received by an ordinary node, the better its qualification credit, and the more difficult and rewarding tasks can be received. At the end of the life cycle of the subject task ledger, the task quality audit node looks for the highest quality contribution of each sub-task and give reward which has been multiplied by k to the contributor.

Based on the above principles, as shown in FIG. 1, the contribution incentive-based blockchain collaboration method provided by the present invention includes the following steps:

1. Establishing a cluster of nodes of the blockchain and dividing them in manner of roles, wherein the cluster of nodes includes an ordinary node, a qualification assessment node, and a task quality audit node.

2. After the ordinary node joins a distributed collaboration system for the first time, applying to the qualification assessment node for registered qualification; by the qualification assessment node, giving the initial qualification credit to the ordinary node, recording the initial qualification credit of the ordinary node into a qualification credit ledger, specifically:

2.1. After the ordinary node joins a distributed collaboration system for the first time, applying to the qualification assessment node for registered qualification.

2.2. By the qualification assessment node, giving the initial qualification credit to the ordinary node through an audit rule of a smart contract, wherein the initial qualification credit of the ordinary node can be given according to the actual situation.

2.3 By the qualification assessment node, recording the initial qualification credit of the ordinary node into a qualification credit ledger. When the ordinary node receives the sub-task of the subject task, it needs to receive the sub-task according to the qualification credit of the ordinary node. The higher the qualification credit of the ordinary node, the more difficult sub-task can be received, for example, if the initial qualification credit of an ordinary node is 0, it can only receive sub-tasks with a task difficulty of 0. As the quality audit pass level of the sub-tasks submitted by the ordinary node increases, the qualification credit of the ordinary node rises, for example, rises to 3, then the ordinary node can receive sub-tasks with task difficulty of 0, 1, 2, and 3.

3. Dividing a task into a number of subject tasks and creating corresponding subject task ledgers respectively, and creating a number of sub-tasks corresponding to the subject task in each of the subject task ledgers. Once the subject task ledgers are created, they are broadcasted in the whole network, wherein each original sub-task includes a specific content, a task difficulty coefficient, an expected task performance period, an intended recipient and a task submission time of the sub-tasks. The subject can be the current team structure or business attributes. The subject task ledger has a life cycle.

4. Applying from the ordinary node to the qualification assessment node for receiving the sub-tasks, wherein, one ordinary node can apply for receiving multiple sub-tasks at a time, and multiple ordinary nodes can apply for receiving the same sub-task.

5. By the qualification assessment node, reading the qualification credits of the ordinary node stored in the qualification credit ledger, and according to the contribution incentives and reward of the ordinary node stored in the node reward ledger, auditing all sub-tasks which are applied for reception by the ordinary node through smart contracts. If the qualification credit of the ordinary node meets its preset qualification credit for applying for receiving the sub-task, the audit is passed and the sub-task is assigned to the ordinary node; if the qualification credit of an ordinary node does not meet its preset qualification credit for applying for receiving the sub-task, the audit is not passed, and the ordinary node fails to apply to receive the sub-task, wherein the preset qualification credit of the sub-task can be determined according to the actual situation.

6. By the ordinary node, executing the sub-tasks applied for reception that have passed audit, submitting the completed sub-tasks to the task quality audit node, and recording the completed sub-tasks in the form of blocks in the corresponding subject task ledger, wherein each block includes content quality evaluation scores of the sub-tasks completed by the ordinary node. The calculation of the evaluation scores can be based on the specific conditions to establish the algorithm calculation. The specific process is not described in detail here.

7. By the task quality audit node, calculating the contribution incentive T of the sub-tasks completed by the ordinary node through the smart contract according to formula (1), and writing the contribution incentive T of the ordinary node into the node reward ledger to update the contribution incentive of the ordinary node, wherein, the ordinary node can submit completed sub-tasks to the task quality audit node directly after completing a certain sub-task, or submit completed sub-tasks to the task quality audit node together after completing all sub-tasks.

8. By the task quality audit node, calculating the qualification credit C of the ordinary node according to formula (2), and writing it into the qualification credit ledger to update the qualification credit of the ordinary node in the qualification credit ledger.

9. At the end of a life cycle of each subject task ledger, by the task quality audit node, traversing through each subject task ledger respectively, for finding out the block with the highest content quality evaluation score for each completed sub-task, and giving reward which is k times of the contribution incentive of completing this sub-task to the ordinary node corresponding to the block, and recording it into the node reward ledger to complete the collaboration of the blockchain, wherein the reward indicates the level of completion.

In step 4 above, the higher the contribution incentive and reward obtained by the ordinary node, the more difficult sub-task can be received by the ordinary node, and the reward can be used as a system activity transaction in the subsequent system.

In step 4 above, for a sub-task in a subject task, multiple ordinary nodes can apply for execution. An ordinary node can only view the execution records that have been submitted to the task quality audit node for quality audit and passed. Multiple ordinary nodes execute operations on the same sub-task, and are audited by the task quality audit node and obtain reward in the node reward ledger.

Based on the above-mentioned contribution incentive-based blockchain collaboration method, the present invention also provides a contribution incentive-based blockchain collaboration system: a registering qualification module, which is used to give an initial qualification credit to the ordinary node when the ordinary node applies to a qualification assessment node for registered qualification, and records it in a qualification credit ledger; a task dividing module, which is used to divide a task into a number of subject tasks, to respectively create the corresponding subject task ledgers, and to create a number of sub-tasks corresponding to the subject task in each subject task ledger; a task receiving module for an ordinary node applying to the qualification assessment node to receive sub-tasks; a task audit module, which is used to audit all sub-tasks applied for reception by the ordinary node according to the qualification credits of the ordinary node stored in the qualification credit ledger and the contribution incentive and the reward of the ordinary node stored in the node reward ledger; a data recording module, which is used to record the completed sub-tasks in the form of blocks in the corresponding subject task ledger, wherein each block includes content quality evaluation scores of the sub-tasks completed by the ordinary node; a contribution incentive and qualification credit calculation module, which is used to calculate the contribution incentive and qualification credit of sub-tasks completed by the ordinary node, to update the contribution incentive and qualification credit of the ordinary node; a rewarding module for, at the end of the life cycle of each subject task ledger, the task quality audit node traversing through each subject task ledger respectively, for finding out the block with the highest content quality evaluation score for each completed sub-task, and giving the ordinary node corresponding to the block reward to update the reward of the ordinary node, and then completing the blockchain collaboration.

The above embodiments are only used to illustrate the present invention, wherein the structure, connection mode and manufacturing process of each component can be changed. Any equivalent transformation and improvement based on the technical solution of the present invention should not be excluded from the scope of the present invention.

The invention claimed is:

1. A contribution incentive-based blockchain collaboration method, which is characterized in, comprising:
   1) applying from an ordinary node to a qualification assessment node for registered qualification, wherein the qualification assessment node gives an initial qualification credit to the ordinary node;
   2) dividing a task into a number of subject tasks and creating corresponding subject task ledgers respectively, and creating a number of sub-tasks corresponding to the subject task in each of the subject task ledgers;
   3) applying from the ordinary node to the qualification assessment node for receiving the sub-tasks;
   4) by the qualification assessment node, auditing all sub-tasks which are applied for reception by the ordinary node according to the qualification credit, contribution incentive and reward of the ordinary node;
   5) by the ordinary node, executing the sub-tasks that have passed audit, submitting the completed sub-tasks to the task quality audit node, and recording the completed sub-tasks in the form of blocks in the corresponding subject task ledger, wherein each block includes content quality evaluation scores of the sub-tasks completed by the ordinary node;
   6) by the task quality audit node, calculating the contribution incentives and qualification credits for the sub-tasks completed by the ordinary node, and updating the contribution incentives and qualification credits of the ordinary node;
   7) at the end of a life cycle of each subject task ledger, by the task quality audit node, traversing through each subject task ledger respectively, for finding out the block with the highest content quality evaluation score for each completed sub-task, and giving reward to the ordinary node corresponding to the block to update the reward of the ordinary node, and then completing the blockchain collaboration.

2. The contribution incentive-based blockchain collaboration method of claim 1, characterized in, before applying from the ordinary node to the qualification assessment node for registered qualification, establishing a cluster of nodes of the blockchain and dividing the nodes in manner of roles, wherein the cluster of nodes includes the ordinary node, the qualification assessment node, and the task quality audit node.

3. The contribution incentive-based blockchain collaboration method of claim 1, characterized in that the specific process of step 1) is:
   1.1) after the ordinary node joins a distributed collaboration system for the first time, applying to the qualification assessment node for registered qualification;
   1.2) by the qualification assessment node, giving the initial qualification credit to the ordinary node through an audit rule of a smart contract;
   1.3) by the qualification assessment node, recording the initial qualification credit of the ordinary node into a qualification credit ledger.

4. The contribution incentive-based blockchain collaboration method of claim 3, characterized in that the higher the qualification credit of the ordinary node in step 1.3), the more difficult sub-tasks can be received.

5. The contribution incentive-based blockchain collaboration method of claim 1, characterized in that the sub-tasks in step 2) include a specific content, a task difficulty coefficient, an expected task performance period, an intended recipient and a task submission time of the sub-tasks.

6. The contribution incentive-based blockchain collaboration method of claim 1, characterized in that, in step 3), one ordinary node can apply for receiving multiple sub-tasks at a time, and multiple ordinary nodes can apply for receiving the same sub-task.

7. The contribution incentive-based blockchain collaboration method of claim 1, characterized in that the audit process of step 4) is:
   4.1) if the qualification credit of the ordinary node meets its preset qualification credit for applying for receiving the sub-task, the audit is passed and the sub-task is assigned to the ordinary node;
   4.2) if the qualification credit of an ordinary node does not meet its preset qualification credit for applying for receiving the sub-task, the audit is not passed, and the ordinary node fails to apply to receive the sub-task.

8. The contribution incentive-based blockchain collaboration method of claim 1, characterized in that the specific process of step 6) is:
   6.1) by the task quality audit node, calculating the contribution incentives for sub-tasks completed by the ordinary node through a smart contract, and writing the contribution incentives into a node reward ledger to update the contribution incentives of the ordinary node, wherein the contribution incentives of the sub-tasks are:
   wherein T is the contribution incentives of the sub-tasks, m is the number of received tasks, n is the number of completed tasks, xi is a completed task quality of the i-th task, pi is a task difficulty coefficient of the i-th task, yi is an expected task performance period of the i-th task, and zi is an actual task performance period of the i-th task;

6.2) by the task quality audit node, calculating the qualification credit of the ordinary node and writing the qualification credit into a qualification credit ledger to update the qualification credit of the ordinary node, wherein the qualification credit of the ordinary node is:

wherein C is the qualification credit, Normalization is the normalization process; and k is a multiple of reward.

9. The contribution incentive-based blockchain collaboration method of claim 8, characterized in that the reward in step 7) is k times of the contribution incentive for completing the sub-task by the ordinary node corresponding to the block.

* * * * *